US012682440B2

(12) United States Patent
      Kaczor

(10) Patent No.:    US 12,682,440 B2
(45) Date of Patent:       Jul. 14, 2026

(54) METHOD FOR DETECTING ARTIFACTS IN INFRARED (IR) ILLUMINATED IR IMAGES

(71) Applicant: Aptiv Technologies AG, Schaffhausen (CH)

(72) Inventor: Krzysztof Kaczor, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 238 days.

(21) Appl. No.: 18/747,874

(22) Filed: Jun. 19, 2024

(65) Prior Publication Data

US 2025/0315930 A1      Oct. 9, 2025

(30) Foreign Application Priority Data

Apr. 4, 2024    (EP) ..................................... 24168398

(51) Int. Cl.
      *G06T 7/00*          (2017.01)
      *G06T 7/11*          (2017.01)
      *G06T 7/162*         (2017.01)
      *G06T 7/174*         (2017.01)
(52) U.S. Cl.
      CPC .............. *G06T 7/0002* (2013.01); *G06T 7/11* (2017.01); *G06T 7/162* (2017.01); *G06T 7/174* (2017.01); *G06T 2207/10048* (2013.01); *G06T*

*2207/20072* (2013.01); *G06T 2207/20224* (2013.01); *G06T 2207/30168* (2013.01)

(58) Field of Classification Search
      None
      See application file for complete search history.

(56) References Cited

FOREIGN PATENT DOCUMENTS

CN           214009130 U   *   8/2021

OTHER PUBLICATIONS

S. H. Majeed and N. A. M. Isa, "Iterated Adaptive Entropy-Clip Limit Histogram Equalization for Poor Contrast Images," in IEEE Access, vol. 8, pp. 144218-144245, 2020. (Year: 2020).*

* cited by examiner

*Primary Examiner* — David Ometz
(74) *Attorney, Agent, or Firm* — Michael P. Doerr

(57) ABSTRACT

The present disclosure relates to a computer implemented method for detecting artifacts in infrared (IR) illuminated IR images. Artifacts are separated from real objects by analyzing results of regression line fits to histograms of pixel values. Artifacts will have smooth transition gradients and therefore will show smaller deviations of the regression line fit to the histogram data.

15 Claims, 3 Drawing Sheets

Roi [1][0]

type: 1CUD   bins: 50  smpls: 14653   acc: 1
regression: 335.686339x + 2287.484706
rmse: 2614.862656      hMaxV: 255

Roi [1][1]

type: 1CUD   bins: 87  smpls: 8874   acc: 1
regression: 93.992145x + 1712.372257
rmse: 505.795305      hMaxV: 255

METHOD FOR DETECTING ARTIFACTS IN INFRARED (IR) ILLUMINATED IR IMAGES

CROSS-REFERENCE TO RELATED APPLICATIONS

This application claims the benefit and priority of European patent application number EP24168398.6, filed on Apr. 4, 2024. The entire disclosure of the above application is incorporated herein by reference.

FIELD

This section provides background information related to the present disclosure which is not necessarily prior art.

The present disclosure relates a method for detecting artifacts in infrared (IR) illuminated IR images.

BACKGROUND

Digital imaging devices, such as digital cameras, are used in automotive applications to survey and monitor the interior and the surroundings of vehicles. To obtain an adequate image quality also in low illumination areas or during night time, infrared (IR) camera systems often use active IR illumination which provides additional brightness for the camera system by illuminating the scene without enlightening the scene at optical wavelengths and creating disturbing effects.

IR camera systems with IR illumination often suffer from the problem that IR illumination is leaking to the sensor of the camera system. The leakage may result from an imperfect assembly of the camera system and may in particular be related to the gasket ring within the camera system allowing a leakage of IR illumination to the sensor, also known as the "gasket ring problem".

This type of problem significantly reduces image quality delivered by the camera system due to artifacts having the shape of bright spots appearing on the image.

Detection of such artifacts, also referred to as leakage artifacts in the following, during image quality test procedures has proven to be not a trivial task. In this respect, one of the major challenges is to distinguish the leakage artifacts from real objects. One of the often-used criteria that allows for such separation is the artifacts/object edge transition. This criterion is based on the expectation that objects have sharp edges whereas edges of leakage artifacts follow a smooth transition.

Previous attempts for detecting edge blurriness and a smooth edge transition were based on variance analysis of edge pixels, evaluation of the Edge Spread Function (ESF) and deep learning.

Variance analysis computes the variance of edge pixels and decides on that basis on the edge transition class. However, as the variance is an accumulative factor that loses information about transition, this method is not suitable for this kind of detection. For example, evaluation of the variance for the following data samples S1=(1, 2, 3, 4, 5, 6, 7, 8, 9, 10) and S2=(1, 1, 1, 1, 1, 1, 1, 1, 1, 10) will lead to a false classification. The variance of the first data set S1 is 8.25 and the variance of the second data set S2 is 7.29. Thus, based on the variance analysis, the first data set S1 would be more likely classified as sharp edge transition than the second data set S2. Nevertheless, the first data set S1 corresponds to a smooth edge transition for which variance is assumed to be lower than for the second data set S2 which corresponds to a very sharp edge transition.

For the evaluation of the ESF, an edge has to be identified and selected. The ESF analysis provides adequate results in controlled environments, for example for a predetermined test pattern. However, the ESF analysis is not suited for uncontrolled environments where various kinds of problems may arise. In this respect it may for example not be possible to make an assumption on the shape of the leakage artifacts. In some other cases, it may not be possible to identify an edge of the light leakage artifacts, for example in cases where the leakage artifact covers most of the image. Identifying and selecting a well-suited edge for the ESF analysis may be complex and lead to performance problems. But even if a suitable edge has been identified, the ESF analysis does only perform a local check of the edge characteristics. This produces unreliable classification results since other edges of the same analyzed object may have completely different characteristics.

A classification based on deep learning, on the other hand, is too demanding and not acceptable from the performance point of view.

Accordingly, there is a need for an improved method for artifact detection which works reliably in uncontrolled environments.

SUMMARY

This section provides a general summary of the disclosure, and is not a comprehensive disclosure of its full scope or all of its features.

The present disclosure provides a computer implemented method, a computer system, a non-transitory computer readable medium, and a Autonomous Driving system or Advanced Driver Assistant System for vehicles according to the independent claims. Embodiments are given in the subclaims, the description and the drawings.

In one aspect, the present disclosure is directed at a computer implemented method for detecting artifacts in infrared (IR) illuminated IR images, the method comprising:

acquiring at least a first IR frame F1 with a first exposure time ET1 under a condition of active IR illumination;

creating an input frame for performing frame segmentation based on the first IR frame F1;

performing frame segmentation on the input frame for acquiring positions and boundaries of a plurality of frame segments, each frame segment comprising a plurality of pixels being attributed to a same object;

for each of the plurality of frame segments:

calculating a histogram of pixel values by binning the pixel values into K bins with K being a positive number, fitting a regression line $a+b*x$ to the histogram, calculating a deviation between the fitted regression line and the histogram, and in case the deviation is smaller than a predetermined deviation threshold T, classifying the frame segments as an artifact.

The method reliably detects artifacts in infrared (IR) illuminated IR images. The IR images, also referred to as IR frames, are acquired by a camera comprising at least one IR sensor sensitive to IR radiation or a camera system comprising at least one camera equipped with at least one IR sensor. The camera or the camera system is provided with an IR illumination unit, for example comprising at least one IR LED (Light Emitting Diode), for illuminating the image scene with additional IR radiation. The acquired images may be of a surrounding of a vehicle during the vehicle production process.

The method for light leakage detection in IR cameras or IR camera systems provides a reliable separation between objects and artifacts. The method is based on the distribution of pixel values of leakage artifacts having smooth gradients while the respective distributions of real objects having steeper gradients. Leakage artifacts with ideal smooth gradients will produce brightness histograms showing a linear dependence with brightness. The method therefore uses histogram data to robustly separate between artifacts and real objects.

The method reliably identifies artifacts independent from their shape and works in uncontrolled environments. In particular, the method does not make use of any test pattern and does not rely on assumptions on a shape of the artifacts.

The method uses all pixels of a frame segment, and not only a smaller subset, for the calculations and the classification of the frame segment. Therefore, selection effects due to wrongly selected subsets of pixels are avoided, leading to more robust and reliable results. In particular, the method does not comprise an edge detection and edge selection step which reduces computer demands and avoids false classifications due to edges not being representative for the analyzed frame segment. Therefore, an implementation of the method can be kept performance friendly as the computational effort for performing the method can be kept low.

The classification of artifacts is based on frame segments identified in an input frame for frame segmentation. The input frame is created based on a first IR frame F1 taken with a first exposure time ET1 and under a condition of active IR illumination. The term "based on" includes all operations which may be performed with the first IR frame F1. For example, the input frame may be a pure copy of the first IR frame F1 and/or may be identical to the first IR frame F1. The input frame may also be the result of an arithmetic operation applied to the first IR frame F1 and/or may include an arithmetic combination with at least one other IR frame. The input frame may also only comprise and/or use subregions of the first IR frame F1 or sub-regions of the result of an arithmetic operation applied to the first IR frame F1 and/or of the arithmetic combination with at least one other IR frame. The exposure time ET1 should be long enough to make the artifacts visible but short enough to make ambient light and IR reflective real objects invisible. The first exposure time ET1 can therefore be short and can for example be in the range of a few tens of microseconds.

Frame segmentation yielding positions and boundaries of a plurality of frame segments is performed on the input frame. Each of the frame segments comprises a plurality of pixels which are attributed to a same object. In particular, the step of performing frame segmentation may also include the step of determining bounding boxes, i.e. lower and upper boundaries in the frame width and height directions, for each of the detected frame segments.

For each of the plurality of frame segments, a histogram of pixel values is calculated. The respective pixel values relate to the amount of IR radiation accumulated within a single pixel of an IR image during an exposure. The pixel value therefore corresponds to the brightness of a single pixel of an IR image. Each histogram bin corresponds to a range of pixel values, and the histogram value corresponds to the number of pixels having a pixel value or brightness within the given pixel value or brightness range.

A regression line a+b*x is fitted to the histogram and line coefficients a, b are calculated. A linear fit of a regression line is used since an ideal smooth transition gradient will result in a histogram showing a linear dependence with rising pixel values or pixel brightness.

The deviation between the fitted regression line and the histogram is calculated and compared to a predetermined deviation threshold T. A frame segment having a calculated deviation smaller than the deviation threshold T is classified as artifact.

The choice of the statistical method used for calculating the deviation is not particularly limited as long as the statistical method provides a measure for the accuracy or goodness of the fit to the histogram.

For frame segments being classified as an artifact, classification results may be stored, for example in a memory unit or in a data base. Alternatively, or in addition to storing the classification results, a signal, particularly an optical, electrical or acoustic signal may be output once an artifact has been detected. This may allow to refine the assembly of the camera or the camera system in real-time during image quality test procedures.

Based on the smooth transition gradients of leakage artifacts, the method provides a robust separation between leakage artifacts and real objects which reliably works in uncontrolled environments.

According to an embodiment, the method further comprises the steps of acquiring a second IR frame F2 with the exposure time ET1 under a condition of inactive IR illumination, performing frame subtraction by calculating a first difference frame R=F1−F2, and creating the input frame for performing frame segmentation based on the first difference frame R. The classification of artifacts is thus based on the first difference frame R. The difference frame R is calculated by a pixel wise subtraction of images F1 and F2. The subtraction of frames F1 and F2 taken with the same exposure time ET1 but under different IR illumination conditions removes ambient light from the first difference frame R and creates a smooth background for the frame segments. The difference frame R is therefore particular useful in cases where short exposure times, for example in the range of a few tens of microseconds, cannot be achieved due to hardware limitations and longer exposure times, for example in the range of a few seconds, are used.

According to an embodiment, the method further comprises the steps of acquiring a third IR frame F3 with an exposure time ET2 smaller than the first exposure time ET1 under a condition of active IR illumination, performing frame subtraction by calculating a second difference frame D=R−F3, and creating the input frame for performing frame segmentation based on the second difference frame D. The classification of artifacts is thus based on the second difference frame D. The difference frame D is calculated by a pixel wise subtraction of images R and F3. The subtraction of the frame F3 taken under active illumination condition, but with a smaller exposure time ET2 than the frame F1 from the first difference frame R creates a second difference frame D. In the second difference frame D, ambient light and also IR reflections of real objects are removed. The second difference frame D is therefore provided with a boosted appearance of artifacts.

According to an embodiment, the method further comprises the steps of
acquiring a second IR frame F2 with the exposure time ET1 under a condition of inactive IR illumination;
performing frame subtraction by calculating a first difference frame RS=ssub(F1,F2), wherein $$ssub(X,Y) = \begin{cases} X_{i,j} - Y_{i,j}, & X_{i,j} \geq Y_{i,j} \\ 0, & X_{i,j} < Y_{i,j} \end{cases} \text{ for every } (i,j) \in ([1,W]) * [1,H]),$$

with

X$_{i,j}$: pixel value at position (i,j) in frame X,

Y$_{i,j}$: pixel value at position (i,j) in frame Y,

W: number of pixels in width direction in frames X and Y,

H: number of pixels in height direction in frames X and Y; and creating the input frame for performing frame segmentation based on the first difference frame RS.

The classification of artifacts is thus based on the first difference frame RS. The difference frame RS is calculated by a pixel wise subtraction operation ssub with saturation to zero which avoids negative pixel values in the difference frame RS. The subtraction of frames F1 and F2 taken with the same exposure time ET2 but under different IR illumination conditions removes ambient light from the first difference frame RS and creates a smooth background for the frame segments. The difference frame RS is therefore particular useful in cases where short exposure times, for example in the range of a few tens of microseconds, cannot be achieved due to hardware limitations and longer exposure times, for example in the range of a few seconds, are used.

According to an embodiment, the method further comprises the steps of acquiring a third IR frame F3 with an exposure time ET2 smaller than the first exposure time ET1 under a condition of active IR illumination, performing frame subtraction by calculating a second difference frame DS=ssub(RS,F3), and creating the input frame for performing frame segmentation based on the second difference frame DS. The classification of artifacts is thus based on the second difference frame DS. The difference frame DS is calculated by a pixel wise subtraction operation ssub with saturation to zero which avoids negative pixel values in the difference frame DS. The subtraction of the frame F3 taken under active illumination condition, but with a smaller exposure time ET2 than the frame F1 from the first difference frame RS creates a second difference frame DS. In the second difference frame DS, ambient light and also IR reflections of real objects are removed. The second difference frame DS is therefore provided with a boosted appearance of artifacts.

According to an embodiment, the method further comprises the steps of defining a histogram fitting region between a lower histogram bin and an upper histogram bin, and fitting the regression line a+b*x within the histogram fitting region to the histogram. The histogram fitting region may define a range of histogram bins allowing a reliable and robust separation between artifacts and real objects on the basis of linear fits to the histogram data.

According to an embodiment, the lower histogram bin corresponds to the bin comprising the lowest pixel value above zero contributing to the histogram and the upper histogram bin corresponds to the largest pixel value below the pixel saturation value contributing to the histogram. Choosing the boundaries of the histogram fitting region in this way ensures that histogram bins corresponding to negative pixel values, the zero pixel value or the pixel saturation value, for example corresponding to a 255 pixel value for an 8 bit grayscale frame, do not affect the accuracy and reliability of the fit to the histogram data. Furthermore, the histogram is trimmed by removing all starting and ending histogram bins which do not contain any contributing pixel and may distort the regression line fit. The histogram bins corresponding to negative pixel values, the zero pixel value and/or the pixel saturation value may also be removed from the histogram before a histogram fitting region is defined.

According to an embodiment, the deviation is calculated as the root mean square error, RMSE, between the histogram values and the fitted regression line, and frame segments with a calculated RMSE value smaller than a RMSE threshold TRMSE equal to the deviation threshold T are identified and classified as artifacts. The smaller the RMSE value, the smaller the overall deviation of the fitted regression line to the histogram and the better the agreement between the histogram and the fitted regression line. Frame segments with smaller RMSE values of the regression line fit to the histogram will therefore more likely show smooth brightness gradients and accordingly will be classified as an artifact.

According to an embodiment, the RMSE value is calculated as $$RMSE = \sqrt{\left(\sum_I (H_I - F_I)^2\right)},$$

H$_I$: hist m value ogra in histogram bin I,

F$_I$: value of fitted regression line in histogram bin I.

The RMSE value is derived from the square of the difference between histogram values H$_I$ in a given histogram bin I and the fitted regression line F$_I$ evaluated for example at the center of the histogram bin I.

According to an embodiment, the step of performing frame segmentation further includes removing frame segments having a size below a predetermined size threshold and/or removing frame segments having an accumulated total brightness below a predetermined brightness threshold. The size and brightness thresholds can be selected according to a tradeoff between completeness of artifact detection and computational effort. Small and/or dark artifacts may not create disturbing effects in the IR frames. It might therefore not be necessary to identify such classes of artifacts in the IR frames. Depending on the chosen frame segmentation method, a considerable fraction of these small and/or dark artifacts may moreover be false detections or noise artifacts. An analysis of these false detections would be without further benefit, but would increase the computational costs of a classification.

According to an embodiment, the number K of histogram bins is in a range between 20 and 120. In particular, the number of histogram bins could be 30, 40, 50, 60, 70, 80, 90, 100 or 110. With this number of histogram bins, it is ensured that the analysis of the histogram provides meaningful and robust results which are unaffected by statistical noise.

According to an embodiment, the method further comprises the step of accumulating the histogram. The accumulated histogram may also be used for classifying frame segments as artifacts. In particular, the accumulated histogram may be useful for small or low brightness frame segments, where the number of useful histogram bins may be limited and the accumulated histogram may enable a less noisy and more robust detection of a smooth transition gradient.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

In yet another aspect, the present disclosure is directed at a Autonomous Driving, AD, system or Advanced Driver Assistant System, ADAS, for vehicles comprising the computer system described herein. The AD system or the ADAS comprises at least one camera or at least one camera system configured to acquire IR images. The camera comprises at least one IR sensor sensitive to IR radiation. The camera system comprises at least one camera equipped with at least one IR sensor. The camera or the camera system is provided with an IR illumination unit, for example comprising at least one IR LED, for illuminating the image scene with additional IR radiation.

In yet another aspect, the present disclosure is directed at the use of the computer system described herein for Autonomous Driving, AD, or Advanced Driver Assistant Systems, ADAS, applications for vehicles, the AD system or the ADAS comprising at least one camera or at least one camera system configured to acquire IR images. The camera comprises at least one IR sensor sensitive to IR radiation. The camera system comprises at least one camera equipped with at least one IR sensor. The camera or the camera system is provided with an IR illumination unit, for example comprising at least one IR LED, for illuminating the image scene with additional IR radiation.

Further areas of applicability will become apparent from the description provided herein. The description and specific examples in this summary are intended for purposes of illustration only and are not intended to limit the scope of the present disclosure.

DRAWINGS

Exemplary embodiments and functions of the present disclosure are described herein in conjunction with the following drawings, showing schematically:

Corresponding reference numerals indicate corresponding parts throughout the several views of the drawings.

DETAILED DESCRIPTION

Example embodiments will now be described more fully with reference to the accompanying drawings.

Figure 1:
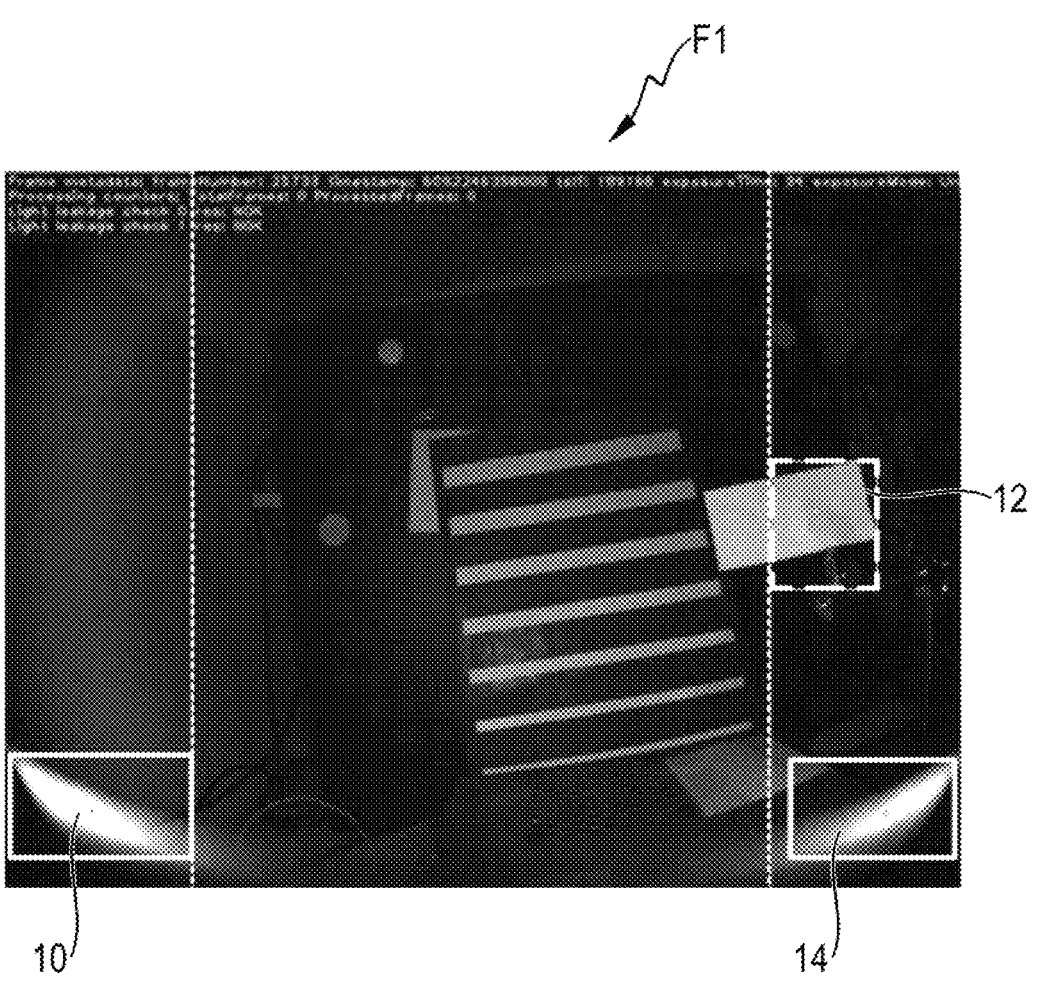
FIG. 1 is an example of a first IR frame acquired according to an embodiment of the method.

FIG. 1 depicts an example of a first IR frame F1 acquired according to an embodiment of the method for detecting artifacts. FIG. 1 shows an example scene with light leakage problems appearing on the left and right bottom corners of the frame F1. Center positions and bounding boxes of some exemplary frame segments 10, 12, 14 detected within the frame F1 during the frame segmentation step are marked by solid and dashed white boxes. The frame segments include leakage artifacts 10, 14 and a real object 12. Frame segmentation has been restricted to a left and a right region of interest marked by dotted white lines.

Figure 2:
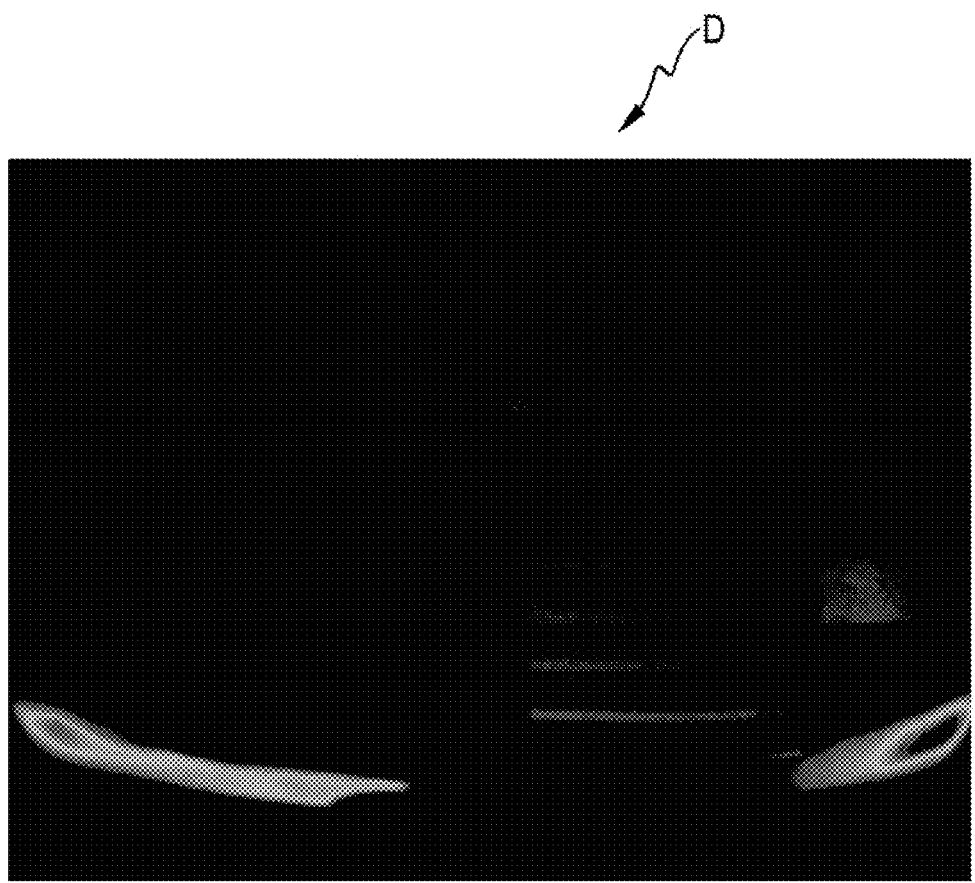
FIG. 2 is an example of a second difference frame D according to the embodiment of FIG. 1.

FIG. 2 shows an example of a second difference frame DS according to the embodiment of FIG. 1. The difference frame DS is the result of the subtraction operation ssub applied to three input frames, with the first IR frame F1 from FIG. 1 being one of them. The difference frame DS is a direct input for the method of detecting artifacts using brightness histogram data.

Figure 3:
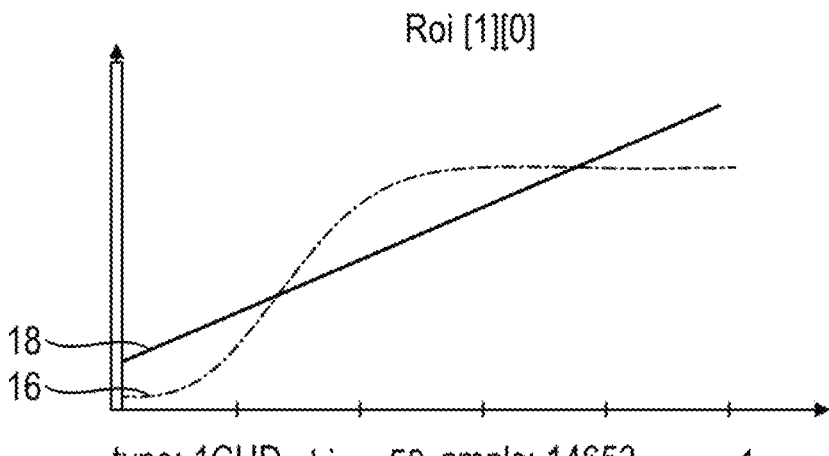
FIG. 3 is an illustration of a regression line fit to a histogram of a frame segment classified as real object according to the embodiment of FIG. 1.

FIG. 3 shows a histogram 16 of the frame segment 12 using K=50 histogram bins for binning the frame data. FIG. 3 also includes a regression line fit 18 to the histogram 16. The regression line fit 18 has a root mean square error (RMSE) value of 2614 which is larger than a predetermined threshold TRMSE of 1000. Based on the comparison of the RMSE value, which may be regarded as transition score, with the threshold TRMSE, the method therefore correctly classifies the frame segment 12 as real object.

Figure 4:
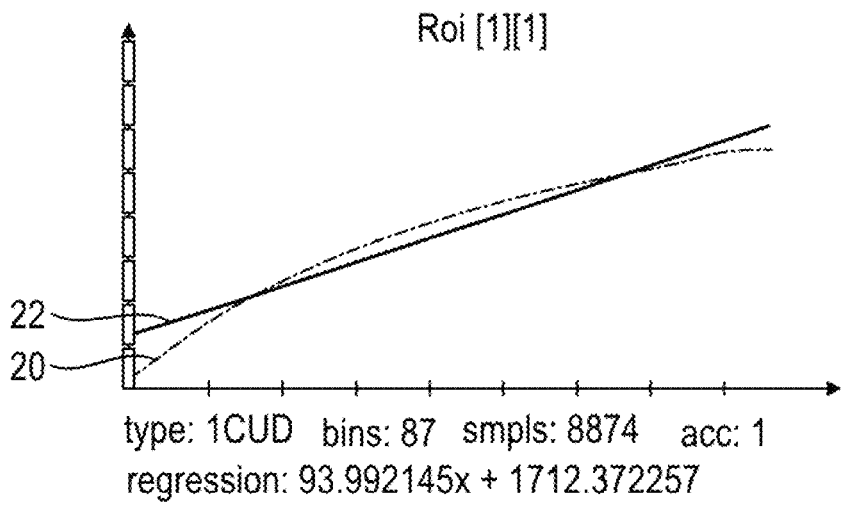
FIG. 4 is an illustration of a regression line fit to a histogram of a frame segment classified as leakage artifact according to the embodiment of FIG. 1.

FIG. 4 shows a histogram 20 of the frame segment 10 using K=87 histogram bins for binning the frame data. FIG. 4 also includes a regression line fit 22 to the brightness histogram 20. The regression line fit 18 has a RMSE value of 505 which is smaller than the predetermined threshold TRMSE of 1000. Based on its smooth transition gradient, the method therefore correctly classifies the frame segment 10 as leakage artifact.

REFERENCE NUMERAL LIST

10 Frame segment
12 Frame segment
14 Frame segment
16 Brightness histogram
18 Regression line fit
20 Brightness histogram
22 Regression line fit

What is claimed is:

1. Computer implemented method for detecting artifacts in infrared (IR) illuminated IR images, the method comprising:

acquiring at least a first IR frame with a first exposure time under a condition of active IR illumination;

creating an input frame for performing frame segmentation based on the first IR frame;

performing frame segmentation on the input frame for acquiring positions and boundaries of a plurality of frame segments, each frame segment comprising a plurality of pixels being attributed to a same object;

for each of the plurality of frame segments:

calculating a histogram of pixel values by binning the pixel values into K bins with K being a positive number, fitting a regression line to the histogram, calculating a deviation between the fitted regression line and the histogram, in response to the deviation being smaller than a predetermined deviation threshold, classifying the frame segments as an artifact.

2. The method of claim 1, further comprising the steps of:

acquiring a second IR frame with the first exposure time under the condition of inactive IR illumination;

performing frame subtraction by calculating a first difference frame; and creating the input frame for performing frame segmentation based on the first difference frame.

3. The method of claim 2, further comprising the steps of:

acquiring a third IR frame with a second exposure time smaller than the first exposure time under the condition of active IR illumination;

performing frame subtraction by calculating a second difference frame; and creating the input frame for performing frame segmentation based on the second difference frame.

4. The method of claim 1, further comprising the steps of acquiring a second IR frame with the first exposure time under the condition of inactive IR illumination;

performing frame subtraction by calculating a first difference frame (RS) based on the equation RS=ssub (first IR frame, second IR frame), wherein $$ssub(X, Y) = \begin{cases} X_{i,j} - Y_{i,j}, & X_{i,j} \geq Y_{i,j} \\ 0, & X_{i,j} < Y_{i,j} \end{cases} \text{ for every } (i, j) \in ([1, W]) * [1, H],$$

with $X_{i,j}$: pixel value at position (i,j) in frame X, $Y_{i,j}$: pixel value at position (i,j) in frame Y, W: number of pixels in width direction in frames X and Y, H: number of pixels in height direction in frames X and Y; and creating the input frame for performing frame segmentation based on the first difference frame RS.

5. The method of claim 4, further comprising the steps of:

acquiring a third IR frame with a second exposure time smaller than the first exposure time under the condition of active IR illumination;

performing frame subtraction by calculating a second difference frame; and creating the input frame for performing frame segmentation based on the second difference frame DS.

6. The method of any one of claim 1, further comprising the steps of defining a histogram fitting region between a lower histogram bin and an upper histogram bin, and fitting the regression line within the histogram fitting region to the histogram.

7. The method of claim 6, wherein the lower histogram bin corresponds to the bin comprising the lowest pixel value above zero contributing to the histogram and the upper histogram bin corresponds to the largest pixel value below the pixel saturation value contributing to the histogram.

8. The method of claim 1, wherein the deviation is calculated as the root mean square error between the histogram values and the fitted regression line and frame segments with a calculated root mean square error value smaller than a root mean square threshold equal to the deviation threshold are identified and classified as artifacts.

9. The method of claim 8, wherein the root mean square error value (RMSE) is calculated based on the equation:

$$RMSE = \sqrt{\left(\sum_1 (H_1 - F_1)^2\right)},$$

$H_I$: histogram value in histogram bin I, $F_I$: value of fitted regression line in histogram bin I.

10. The method of claim 1, wherein the step of performing frame segmentation further includes removing frame segments having a size below a predetermined size threshold and/or removing frame segments having an accumulated total brightness below a predetermined brightness threshold.

11. The method of claim 1, wherein the number K of histogram bins is in a range between 20 and 120.

12. The method of claim 1, further comprising the step of accumulating the histogram.

13. A computer system configured to carry out the computer implemented method of claim 1.

14. A non-transitory computer readable medium comprising instructions for carrying out the computer implemented method of claim 1.

15. An Autonomous Driving (AD) system or Advanced Driver Assistant System (ADAS) for vehicles comprising the computer system of claim 13.

* * * * *